United States Patent Office 2,833,826
Patented May 6, 1958

2,833,826

PREPARATION OF DIXYLYL SULFONE

James A. Jarboe III, Texas City, Tex., assignor to The American Oil Company

No Drawing. Application April 7, 1955
Serial No. 500,020

8 Claims. (Cl. 260—607)

This invention relates to a process for the preparation of normally liquid dixylyl sulfones by reacting sulfuric acid and mixed $C_8$ aromatic hydrocarbons.

U. S. 2,556,429 sets out a process for the preparation of a normally liquid mixture of dixylyl sulfones. The feed to the process is a mixture of all four $C_8$ aromatic hydrocarbons. The process described requires reaction times ranging from about 20 hours to as much as 80 hours. These long reaction times require such a large capital investment and high operating cost that the dixylyl sulfones have not been adopted commercially even though they are excellent plasticizers for vinyl resins.

The extremely long reaction times are believed to be caused by the very slow increase in temperature of the reaction zone from the sulfonation reaction temperature, which is carried out at about the boiling point of xylenes, to the temperatures on the order of about 315° F. at which the sulfone reaction goes most rapidly. The process of U. S. 2,556,429 gives high yield of the desired refined dixylyl sulfones and very limited formation of tarry materials by decomposition of the sulfones. In an attempt to reduce the overall reaction time, the preparation has been carried out as follows:

The reaction of xylene and sulfuric acid to substantially only xylenesulfonic acid is carried out at about the boiling point of xylene using about the theoretical amount of xylene for the xylenesulfonic acid reaction, namely, 1 mole of xylene per mole of acid. (The process of the patent begins with about the theoretical requirement for the ultimate production of the sulfone, namely, about 2 moles of xylene per mole of sulfuric acid.) At the completion of the sulfonation reaction, the temperature of the reaction mixture is increased to about 315° F. and the temperature is maintained at this point by charging additional xylene to the reaction zone. By the use of this two-step operation with respect to xylene addition, the reaction times have been reduced to about 10 hours. However, this procedure has the very serious drawback that by-product tarry materials are produced in large amounts. In many instances, the amount of tarry material produced is about equal to the amount of dixylyl sulfone product. Even though the by-product losses are high, the savings on investment and operating costs as the result of the shorter operating time makes the foregoing two-step procedure economically more attractive than the longer reaction time process set out in U. S. 2,556,429.

An object of the invention is a proces for the preparation of a normally liquid mixture of dixylyl sulfone isomers. Another object of the invention is a dixylyl sulfone preparation process wherein the reaction time is suitably short. Another object is a dixylyl sulfone preparation process wherein the yield of by-product tarry material is minimized. A particular object is a process of preparing normally liquid dixylyl sulfone isomers by reacting $C_8$ aromatic hydrocarbons and sulfuric acid, which process is characterized by good yield of dixylyl sulfone product and little or substantially no yield of undesired tarry material, and a reaction time which is suitable for economic operation. Other objects will become apparent in the course of the detailed description.

In the process of this invention, the by-product yield of tarry material is substantially eliminated and rapid reaction time is obtained by carrying out the reaction utilizing an excess of xylene feed over the theoretical requirement for sulfone production, operating under reflux conditions at temperatures between about 310° and 340° F., utilizing sufficient super-atmospheric pressure to maintain the xylenes in essentially the liquid state; water is discarded from the condensate and xylene condensate is returned to the reaction zone.

The $C_8$ aromatic hydrocarbon feed mixture to the process includes all of the isomers of xylene and also ethylbenzene. In order to obtain the desired normally liquid product, it is necessary to have in the feed at least about 5 mole percent of either ortho-xylene or ethylbenzene. Preferably at least 5 mole percent of each of these should be present in the feed. The feed mixture of $C_8$ aromatic hydrocarbons consists of ortho-xylene, about 5 to 25%; meta-xylene, about 35 to 50%; para-xylene, about 10 to 25%, and ethylbenzene, about 5 to 20%.

In general, the $C_8$ aromatic hydrocarbon mixture prepared from coal carbonization and the solvent extraction of petroleum distillates are suitable as feed to this process. Thus small amounts of non-aromatic hydrocarbons and sulfur compounds may be present. For a highest quality dixylyl sulfone product, it is preferred to utilize a feed which contains only the $C_8$ aromatic hydrocarbons in the proportion set out above.

In the process, there are two separate chemical reactions. In the first reaction, the sulfuric acid, which may be 93–98% commercial grade acid, reacts with the $C_8$ aromatic hydrocarbons to form sulfonic acids. Hereinafter the product of this reaction is referred to as "xylenesulfonic acid" even though ethylbenzene sulfonic acid is also present therein. In the second reaction, the xylenesulfonic acid reacts with xylene to produce the sulfone. Hereinafter this sulfone product is referred to as "dixylyl sulfone," even though the mixture contains ethylphenyl groups.

Water is produced as one of the products of both the sulfonation reaction and the sulfone reaction. In order to push the equilibrium reaction to the desired product, the reaction is carried out under reflux conditions. Vapors of water formed in the reaction and $C_8$ aromatic hydrocarbons are withdrawn from the reaction zone, condensed, the liquid water separated from the liquid $C_8$ aromatic hydrocarbons (hereinafter referred to as xylene), the liquid water is discarded from the system and the xylene condensate is returned to the reaction zone.

In the process of this invention, an excess of xylene over that theoretically necessary for the formation of sulfone is present in the reaction zone at the start of the reaction. The excess amount of xylene present is between about 50% and 300%, preferably between about 100 and 200%. To illustrate: The theoretical stoichiometric requirement for the formation of dixylyl sulfone from xylene and sulfuric acid is 2 moles of xylene per mole of sulfuric acid. Thus the excess amount should be between about 1 mole of xylene and 6 moles of xylene; in this illustration, the charge to the reaction zone would consist, on a mole ratio basis, of xylene to sulfuric acid of between 3 to 1 and 8 to 1.

Not all of the xylenesulfonic acid produced in the sulfonation reaction is converted to the sulfone. Xylenesulfonic acid may be recycled to the reaction zone as recovered from the sulfone reaction product mixture or xylenesulfonic acid separately produced may be charged to the reaction zone. It is to be understood that the xylenesulfonic acid separately produced must be made by the reaction of the defined $C_8$ aromatic hydrocarbon feed and sulfuric acid. When xylenesulfonic acid is charged to the reaction zone, a sufficient excess amount of xylene must also be charged. Since the stoichiometric requirement of xylene is only 1 mole per mole of xylenesulfonic acid present, the desired excess is obtainable by charging a mole ratio of xylene to xylenesulfonic acid of between 1.5 to 1 and 4 to 1. When operating with a mixture of sulfuric acid and xylenesulfonic acid, the required excess amount of xylene will be determined by the relative amounts of sulfuric acid and xylenesulfonic acid charged.

The reaction may be carried out by, in a first stage, reacting the feed mixture of $C_8$ aromatic hydrocarbons and sulfuric acid at a temperature between about 280° F. and 290° F. to react substantially all the sulfuric acid in forming xylenesulfonic acid. That is, the sulfonation reaction is carried out at about the boiling point of xylenes at ordinary atmospheric pressure. It is to be understood that even during the sulfonation reaction stage, some sulfone is formed. Therefore, even though substantially all the sulfuric acid has been reacted, the sole product is not xylenesulfonic acid.

At the completion of the sulfonation reaction, which is readily observed by the disappearance of the two distinct phases in the reaction zone and the appearance of a single homogeneous liquid phase, the temperature of the reaction mixture is raised to between about 310° F. and about 340° F. At these temperatures, the xylenesulfonic acid and xylene are converted to the desired dixylyl sulfone.

However, a single step operation may be used wherein the entire reaction is carried out at a temperature between about 310° and 340° F., preferably between about 320° and 330° F. In this operation, sufficient super-atmospheric pressure is imposed on the reaction zone to maintain the xylenes in substantially the liquid state. The pressure necessary to maintain a substantially constant temperature in the reaction zone will decrease during the course of the reaction, since the increasing amount of high boiling dixylyl sulfone will depress the partial pressure of the xylene and thereby increase the apparent boiling point of the reactant mixture.

The super-atmospheric pressure utilized in the sulfone reaction of the two-stage operation or the total reaction of the single stage operation has no significant effect upon the rate of removal of water vapor from the reaction zone. The steam tables show that at 280° F., the partial pressure of water is 49.2 p. s. i. and that at 335° F., the partial pressure is 111.8 p. s. i. The data book on hydrocarbons by J. B. Maxwell, Van Nostrand Company, 1950, gives vapor pressures of the $C_8$ aromatic hydrocarbon as follows: o-xylene, 292° F., 14.7 p. s. i., 330° F., 25.0 p. s. i.; meta-xylene, 282° F., 14.7 p. s. i., 330° F., 28.0 p. s. i., ethylbenzene, 277° F., 14.7 p. s. i. and 330° F., 30.9 p. s. i. It is obvious that a super-atmospheric pressure on a reaction zone which is sufficient to maintain the $C_8$ aromatic hydrocarbons in substantially the liquid state will have no significant effect on the rate of vaporization of the water reaction. When operating under the preferred conditions of feed to acid ratio, and the temperature of reaction, suitable results are obtained by operating at a super-atmospheric pressure of between about 25 and 30 p. s. i., i. e., between about 10 and 15 p. s. i. g.

The reaction is continued until the amount of dixylyl sulfone produced is between about 10% and 30% of the theoretical yield. By careful control of the amount of excess xylene present, and the temperature of reaction, it is possible to operate to obtain a higher yield without deleterious effect. In general, the reaction time will fall between about 6 hours and 12 hours and more usually, between about 8 hours and 10 hours. However, by careful control of the ratio and operating at higher temperatures, it is possible to decrease the reaction time somewhat deleterious effect. Prolonged reaction times should be avoided. By operating under the defined conditions of feed to acid and temperature, the formation of undesired tarry material is substantially eliminated. In general, the amount of tarry material will be reduced to 2 or 3 percent of the dixylyl sulfone and more commonly, will be reduced to trace amounts. By operating at conditions to produce lower yield of dixylyl sulfone, the presence of by-product tarry material may be reduced to zero, within the error of determination.

The reaction product mixture contains unreacted xylenes, xylenesulfonic acid and crude dixylyl sulfones. The xylenesulfonic acid is generally separated from the reaction mixture by water washing and dissolving the xylenesulfonic acid into the aqueous phase. Two water washes remove essentially all the xylenesulfonic acid. The crude dixylyl sulfones and xylenes are then normally washed with aqueous caustic solution to remove acidic materials produced as by-products, such as $H_2S$. It is at this point that the process of this invention is of particular value, because it has been found that the presence of tarry material in even small amounts causes very stable emulsions to form between the sulfone-xylene and the aqueous caustic solution. The substantially tarry-material-free crude dixylyl sulfone-xylene mixture produced by this process is very readily washed with aqueous caustic solution without any problem as to emulsification. In the prior art processes, the emulsion is avoided by adding a large excess amount of xylene to the sulfone-xylene mixture; of course, this imposes an economic expense in removing, by distillation, this added xylene.

The xylenes are distilled away from the crude dixylyl sulfone. The refined dixylyl sulfone is obtained by vacuum distillation of the crude dixylyl sulfone; the impurities are tarry material and other higher boiling decomposition products. The refined dixylyl sulfones made by the process of this invention are identical in physical characteristics with those produced by the process of U. S. 2,556,429.

The results obtainable with the process of this invention are set out in the following illustrative examples.

*Test 1*

In this test, the previously described two-stage operation process was utilized. The sulfonation reaction was carried out using a mixture of $C_8$ aromatic hydrocarbons obtained by solvent extraction from a petroleum hydroformate. In the sulfonation reaction, 1.25 moles of feed were reacted with 1 mole of 98% sulfuric acid at 280° F. The sulfonation reaction was completed in about 4 hours. At this time, the temperature of the reaction mixture was increased to 315° F. and over a period of 10 hours, the reaction was continued and the temperature maintained by gradually adding xylenes to the reaction mixture. The total amount of xylene utilized was 2.1 moles per mole of sulfuric acid charged. The dixylyl sulfone product and tarry materials were recovered. In this example, the dixylyl sulfone yield was 14.5 as weight percent of the charge. The yield of tarry materials was 15.1 weight percent of the charge.

*Test 2*

In this test, the two-stage operation was again utilized, except that the sulfone reaction was carried out for only about 8 hours. In this test, the dixylyl sulfone yield was 19.5 weight percent, based on the charge and the tarry yield was 9.8 weight percent, based on charge.

*Test 3*

In this test, the two-stage type of operation was also used, except that excess xylene was added throughout the course of the sulfone reaction and the total xylene to sulfuric acid charge ratio was 2.8, that is, a 40% excess of xylene was used. The total reaction time, including sulfonation reaction and sulfone reaction, was only 10 hours in this test and the temperature of the sulfone reaction was 320° F. The weight percent yield of dixylyl sulfone was 15% of the theoretical and the weight percent yield of tar was 5%. This test shows the importance of the excess xylene in decreasing the tar yield.

Test 4

In this test, a single stage run was made operating at 330° F. and 11 p. s. i. g. The mole ratio of xylene to sulfuric acid was 2.8 and the reaction was carried on for a total of 10 hours. The xylene-sulfonic acid was removed by water washing twice and then the crude dixylyl sulfone-xylene solution was washed with aqueous caustic. No emulsions were formed and a clear break was made between the aqueous caustic layer and the oil layer. The yield of refined dixylyl sulfones was 16 percent of the theoretical. Only trace amounts of tarry materials were present in the reaction product mixture.

Test 5

In Tests 5 through 7, the charge to the reactor consisted of the petroleum $C_8$ aromatic hydrocarbons and xylenesulfonic acid made by reacting the defined $C_8$ aromatic hydrocarbons with 98% sulfuric acid in a separate stage. In this test, the mole ratio of xylene to xylene-sulfonic acid was 2.8. The reaction was carried out at 330° F. at a pressure of 10 p. s. i. g. for a time of 8 hours. The refined dixylyl sulfone yield was 19.8% of the theoretical and no tar was formed.

Test 6

In this test, the mole ratio of xylenes to xylenesulfonic acid was 2.8. The reaction was carried out at 330° F. at 11 p. s. i. g. for a time of 8 hours. The yield of dixylyl sulfone was 18.3% of the theoretical and no tar was formed.

Test 7

In this test, the mole ratio of xylene to xylenesulfonic acid was 3.1. The reaction was carried out at 330° F. at a pressure of 15 p. s. i. g. for a time of 6 hours. The yield of dixylyl sulfone was 12.2% of the theoretical and no tar was formed.

Test No. 7 shows that 6 hours is not a sufficient time for the attainment of dixylyl sulfone production. Tests 5 and 6 show that 8 hours can be utilized with a 50% increase in yield and still no tar formation.

The preferred mode of operation of the process of the invention is a continuous procedure. In this continuous procedure, the charge to the reactor, which is large enough to have a holding time of 8 to 10 hours, consists of the $C_8$ aromatic hydrocarbon mixture, 98% commercial grade sulfuric acid, recycled xylenes and recycled xylenesulfonic acid. Although the reaction is somewhat selective with respect to the orthoxylene, the composition of the unreacted xylenes is still within the desired range and it appears that xylenes can be recycled to extinction. The charge to the reactor is adjusted to have in excess xylene content of 150%. The reactor is operated at a temperature of 335° F. and a pressure of 15 pounds gauge. Vapors of xylene and the vaporized water of reaction are taken overhead to a reflux condenser provided with a water trap. The condensed liquid water is discarded from the system and the condensed xylene is returned continuously to the reactor. Agitation is provided in the reactor even though at steady state and continuous operation substantially a single homogeneous phase will be present in the reactor (except for the vapors passing off to the reflux condenser). The charge is added continuously at a rate sufficient to provide about a 9 hour holdup time in the reaction zone. A portion of the reaction product mixture is withdrawn continuously and passed through a heat exchanger where it is cooled to below the boiling point of water. The cooled reaction product mixture is contacted with hot water in an amount of about 1 volume of water per volume of reaction product mixture.

An aqueous phase of water and dissolved xylenesulfonic acid is separated from the unreacted xylene-crude sulfone solution. The water washing is carried out in a continuous countercurrent tower to simplify equipment installation, but two separate single water washes may be used instead of the continuous tower. The xylene-crude sulfone solution is neutralized by contacting with about an equal volume of 5% aqueous caustic solution. The neutralization is carried out by intimately contacting the two solutions and then separating continuously in a separator. The water washing and the aqueous caustic washing are carried out at elevated temperature in view of the very high viscosity of the dixylyl sulfones at ordinary temperatures.

The neutralized xylene-sulfone solution is passed to a continuous distillation tower where the xylenes are taken overhead, condensed, and recycled to the reactor. The crude dixylyl sulfone bottoms, which consists of the product dixylyl sulfones, trace amounts of tar and other high boiling by-products, is passed to a continuous vacuum distillation tower wherein a refined dixylyl sulfone product is taken overhead and a bottoms product is discarded. This refined dixylyl sulfone product is liquid at ordinary atmospheric temperatures.

Thus having described the invention, what is claimed is:

1. A process for preparing a normally liquid mixture of dixylyl sulfones, which process comprises introducing into a reaction zone a feed mixture of $C_8$ aromatic hydrocarbons consisting of o-xylene, about 5 to 25%, m-xylene, about 35 to 50%, p-xylene, about 10 to 25%, and ethylbenzene, about 5 to 20%, and an acid selected from the class consisting of (a) sulfuric acid and (b) xylenesulfonic acid prepared by reacting said mixture of $C_8$ aromatic hydrocarbons and sulfuric acid, essentially simultaneously in an amount between about 50% and 300% in excess of the stoichiometric requirement for the formation of dixylyl sulfone, said reaction zone being maintained at a temperature between about 310° F. and about 340° F., and a super-atmospheric pressure sufficient to maintain xylenes in essentially the liquid state in said reaction zone; withdrawing a vapor stream of water and xylene to a reflux condenser; separating liquid water from xylene condensate and returning said xylene condensate to said reaction zone; said reaction being continued for a time sufficient to produce dixylyl sulfones in a yield between about 10% and 30% of the theoretical, and recovering from the reaction product mixture a crude dixylyl sulfone mixture containing substantially no tarry materials.

2. The process of claim 1 wherein the acid is 98% sulfuric acid and the mole ratio of said feed to said acid is between about 3 to 1 and 8 to 1.

3. The process of claim 1 wherein the acid is said xylenesulfonic acid and the mole ratio of said feed to said acid is between about 1.5 to 1 and 4 to 1.

4. A process for the preparation of a normally liquid mixture of dixylyl sulfone isomers, which process comprises (1) introducing into a reaction zone essentially simultaneously sulfuric acid and a feed mixture of $C_8$ aromatic hydrocarbons consisting of orthoxylene, about 5 to 25%, meta-xylene, about 35 to 50%, para-xylene, about 10 to 25% and ethylbenzene, about 5 to 20%, the mole ratio of feed to said acid being between about 3 to 1 and 8 to 1, said reaction zone being operated at a temperature between about 280° F. and 290° F., under reflux conditions whereby vapors of xylene and water of reaction are condensed, liquid water separated from xylene condensate and said xylene condensate returned to the sulfonation reaction, for a time sufficient to convert substantially all of said sulfuric acid to xylenesulfonic acid, (2) bringing to and holding said xylenesulfonic acid-containing reaction mixture from step (1) at a temperature between about 310° F. and 340° F., under super-atmospheric pressure sufficient to maintain unreacted xylenes in essentially the liquid state, under reflux conditions, whereby vapors of xylene and water of reaction are condensed, liquid water separated from xylene condensate and said xylene condensate returned to the sulfone reaction, for a time sufficient to convert xylenesulfonic acid to dixylyl sulfone in a yield between about 10% and 30% of the theoretical, said reaction product mixture containing substantially no tarry material, (3) water washing the sulfone reaction product mixture from step (2) to separate unconverted xylenesulfonic acid from crude dixylyl sulfone and unreacted xylenes, and (4) recovering from said crude sulfones, a refined dixylyl sulfone mixture which is normally liquid.

5. The process of claim 4 wherein the sulfone reaction temperature is between about 320° F. and 330° F.

6. The process of claim 4 wherein the mole ratio of feed to sulfuric acid is between about 4 to 1 and 6 to 1.

7. A process for the preparation of a normally liquid mixture of dixylyl sulfone isomers, which process comprises introducing into a reaction zone essentially simultaneously a feed mixture of $C_8$ aromatic hydrocarbons consisting of o-xylene, about 5 to 25%, m-xylene, about 35 to 50%, p-xylene, aobut 10 to 25%, and ethylbenzene, about 5 to 20%, and sulfuric acid, the mole ratio of said feed to sulfuric acid being between about 4 to 1 and 6 to 1, maintaining said reaction zone at a temperature between about 320° F. and 330° F., and a pressure of about 25 to 30 p. s. i., under reflux conditions, whereby vapors of xylene and water of reaction are condensed, liquid water removed from the system and xylene condensate returned to the reaction zone, for a time between about 8 to 10 hours, whereby dixylyl sulfones are produced with substantially no production of tarry materials, separating xylenesulfonic acid and unreacted xylenes from crude dixylyl sulfones and recovering from said sulfones a normally liquid mixture of refined dixylyl sulfone isomers.

8. The process of claim 7 wherein said xylenesulfonic acid is recycled to the reaction zone along with feed $C_8$ aromatic hydrocarbons and unreacted xylenes such that the mole ratio of total $C_8$ hydrocarbons to xylenesulfonic acid is between about 2 to 1 and 3 to 1.

References Cited in the file of this patent

UNITED STATES PATENTS 2,556,429    Lee _____ June 21, 1951